United States Patent [19]

Moser

[11] 4,034,108

[45] July 5, 1977

[54] N-(1'-ALKOXYCARBONYL-ETHYL)-N-HALOACETYL-2,6-DIALKYLANILINES FOR THE CONTROL OF PHYTOPATHOGENIC FUNGI

[75] Inventor: Hans Moser, Magden, Switzerland

[73] Assignee: Ciba-Geigy Corporation, Ardsley, N.Y.

[22] Filed: June 16, 1975

[21] Appl. No.: 587,589

Related U.S. Application Data

[63] Continuation-in-part of Ser. No. 405,618, Oct. 11, 1973, abandoned.

[30] Foreign Application Priority Data

Aug. 29, 1973  Switzerland ............... 1237/73
Oct. 13, 1972  Switzerland ............... 15044/72

[52] U.S. Cl. ........................................... 424/309

[51] Int. Cl.$^2$ ................ A01N 9/20; A01N 9/24
[58] Field of Search ............... 424/309; 260/471 A

[56] References Cited

UNITED STATES PATENTS

| | | | |
|---|---|---|---|
| 3,406,165 | 10/1968 | Kruckenberg | 260/671 A |
| 3,780,090 | 12/1973 | Akiba et al. | 260/671 A |
| 3,836,564 | 9/1974 | Baker et al. | 424/309 |
| 3,892,786 | 7/1975 | Baker et al. | 260/468 |

*Primary Examiner*—Sam Rosen
*Assistant Examiner*—D. W. Robinson
*Attorney, Agent, or Firm*—Harry Falber

[57] ABSTRACT

N-(1'-Alkoxycarbonyl-ethyl)-N-haloacetyl-2,6-dialkylanilines possess microbicidal properties and may be used to combat plant-pathogenic fungi.

9 Claims, No Drawings

N-(1'-ALKOXYCARBONYL-ETHYL)-N-HALOACETYL-2,6-DIALKYLANILINES FOR THE CONTROL OF PHYTOPATHOGENIC FUNGI

CROSS-REFERENCE

This application is a continuation- in part of our application Ser. No. 405,618, filed October 11, 1973, now abandoned.

The present invention relates to compounds of formula I

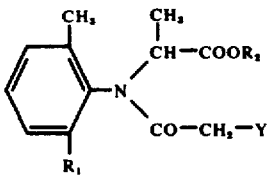

wherein $R_1$ and $R_2$ each independently represent the methyl or ethyl group, and Y represents fluorine, chlorine, bromine or iodine, to processes for the preparation of these compounds, as well as to microbicidal agents containing these new compounds as active substances; and also to processes for the control of phytopathogenic fungi and bacteria by use of the compounds of formula I.

The invention is primarily concerned with compounds of the formula I, with corresponding agents and with their use, wherein one of $R_1$ and $R_2$ represents the methyl group and the other represents the methyl or ethyl group.

In the German "Offenlegungsschrift" No. 2,212,268, it is stated in a general manner that N-haloacylated anilino-alkanecarboxylic acid esters have a selective herbicidal action. Only certain N-haloacetylated 2,6-dialkylanilinoacetic acids and their esters are however mentioned and biologically supported. No reference is made to a microbicidal action, particularly a phytofungicidal action.

The small group of N-(1'-alkoxycarbonyl-ethyl)-N-haloacetyl-2,6-dialkylanilines of formula I of this invention has not been hitherto described in the literature and is hence novel. Extraordinarily surprising is therefore the fact that this group, in contrast to the previously described anilinoacetic acids and anilinoacetic acid esters of DOS 2,212,268, possesses very strong phytofungicidal properties.

Thus the compounds having the characteristic chemical structure of formula I have both a preventive and a curative action against phytopathogenic fungi on cultivated plants, such as, for example, on grain, maize, rice, vegetables, sugar beet, soya beans, peanuts, fruit trees and ornamental plants, especially, however, on grape vines, hops, cucurbitaceae (cucumbers, pumpkins and melons), and solanaceae such as potatotes, tobacco and tomatoes.

Fungi occurring on plants or on parts of plants (fruit, blossom, foliage, stalks, tubers or roots) can be inhibited or destroyed by application of the said active substances, whereby also parts of plants subsequently growing remain preserved from such fungi. The active substances are effective against the phytopathogenic fungi belonging to the following classes: Ascomycetes; Basidiomycetes such as, in particular, rust fungi; Fungi imperfecti; and especially against the Oomycetes belonging to the class of Phycomycetes, such as Phytophthora, Peronospora, Pseudoperonospora or Plasmopara. Furthermore, the compounds of formula I have a systemic action. The preferred group of compounds is that wherein $R_1$ and $R_2$ represent the methyl group.

The preferred compound of formula I is N-(1'-methoxycarbonyl-ethyl)-N-chloroacetyl-2,6-dimethylaniline of the formula

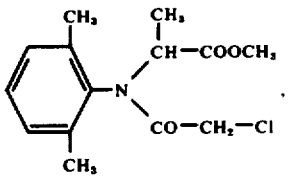

which exhibits the mentioned favourable properties in a particularly advantageous manner and at a very low concentration. The treated cultivated plants are not harmed by application of the small amounts required.

The compounds according to the present invention are prepared, for example, by reaction of an aniline of formula II

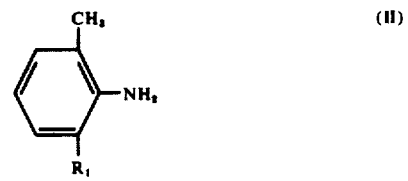

with an α-halopropionic acid ester III

and further resulting intermediate IV

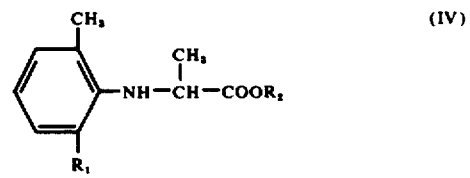

with a haloacetylating agent, preferably with the halide or anhydride of the respective monofluoro-, monochloro-, monobromo- or monoiodoacetic acid. In formulae II, III and IV, the symbols $R_1$ and $R_2$ have the meanings given for formula I, whilst "Hal" in formula III stands for halogen, preferably for chlorine or bromine.

In formulae II and III $R_2$ may also represent hydrogen (=formula V). In this case it is necessary to esterify the intermediate V with methanol or ethanol before haloacetylating.

The reactions can be performed in the presence or absence of solvents or diluents that are inert to the reactants. The following are, for example, suitable: water; aliphatic or aromatic hydrocarbons such as benzene, toluene, xylenes, petroleum ether; halogenated hydrocarbons such as chlorobenzene, methylene chloride, ethylene chloride, chloroform; ethers and ethereal compounds such as dialkyl ether, dioxane, tetrahydrofuran; nitriles such as acetonitrile; N,N-dialkylated amides such as dimethylformamide; alcohols such as ethanol, isopropanol or butanol; also acetic acid, dimethylsulphoxide, and mixtures of such solvents with each other.

Suitable haloacetylating agents to be used are preferably haloacetic acid anhydrides such as chloroacetic acid anhydride, and haloacetic acid halides such as chloroacetyl chloride or -bromide. The reaction can however also be carried out with haloacetic acids or their esters or amides.

The reaction temperatures are between 0° and 180° C, preferably between 20° and 100° C. In some cases, especially with the use of haloacetyl halides, haloacetylation is performed in the presence of an acid-binding agent or of a condensation agent. Suitable as such as tertiary amines such as trialkylamine (e.g., triethylamine), pyridine and pyridine bases, or inorganic bases such as the oxides and hydroxides, hydrogen carbonates and carbonates of alkali metals and alkaline-earth metals, as well as sodium acetate. Dimethylformamide has a catalytic action. An excess of the respective aniline derivative of formula II can moreover serve as the acid-binding agent.

Details regarding the preparation of intermediates of formula IV can be taken from the description of the methods given in general in the following publications for the preparation of anilino-alkanoic acid esters:

J. Org. Chem. 30, 4101 (1965),
Tetrahedron 1967, 487,
Tetrahedron 1967, 493.

The compounds of the formula I contain an asymmetrical carbon atom in the propionic acid ester chain and can be resolved into the optical antipodes in the customary manner. In this connection, the enantiomeric D-form has the far more pronounced microbicidal action. Indeed the activity of the racemic mixture can be attributed predominantly to the presence of the D-form. These D-forms have in ethanol, methanol or acetone a negative angle of rotation. The d-forms (levo-antipodes) therefore constitute to all intents and purposes the active principle.

Within the scope of the invention, those compounds, their compositions and their use which refer to the D-configuration of the formula I are accordingly preferred.

The pure, optical D-antipodes are manufactured, for example, by preparing the racemic compound of the formula V

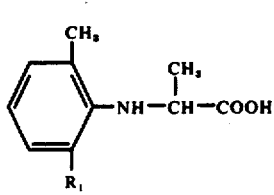

and then reacting this in known manner with a nitrogen-containing, optically active base to give the corresponding salt. The pure D-form is obtained stepwise by fractional crystallisation of the salt and subsequent liberation of the acid of the formula V which is enriched with the optical D-antipode and, if appropriate, by repetition (also repetition several times) of the salt formation, crystallisation and liberation of the α-anilinopropionic acid of the formula V. From this pure D-form it is then possible to obtain the optical D-configuration of the ester of the formula IV in conventional manner for example in the presence of HCl or $H_2SO_4$, with methanol or ethanol. A suitable optically active organic base is, for example, α-phenylethyl amine.

Instead of fractional recrystallization, it is also possible to obtain the enantiomeric D-form of the formula IV by replacing the hydroxy group in the naturally occurring L(+) lactic acid by halogen and reacting this product further with 2,6-dimethylaniline or 2:methyl-6-ethyl-aniline with reversal of the configuration.

The preparation of the active substances of formula I is illustrated by the following Example 1, Temperatures are expressed in degrees Centigrade.

EXAMPLE 1 a. Preparation of α-(2,6-dimethylanilino)-propionic acid methyl ester 6 g-moles of 2,6-dimethylaniline, 6.6 g-moles of $NaHCO_3$ and 18.0 g-moles of α-bromopropionic acid methyl ester are placed together and heated slowly, with stirring, for 1 hour upto 120°–125° C bath temperature. As $CO_2$ is evolved, stirring of the mixture at this temperature is continued for 18 hours. The mixture is subsequently cooled, the inorganic constituents are filtered off, and the filtrate distilled in a water-jet vacuum (ca. 10 – 12 Torr). After removal of the excess α-bromopropionic acid methyl ester, the resulting yield is 990.3 g (79.6% of theory) of final product, which boils at 133°–134° (12 Torr).

b. Preparation of N-(1'-methoxycarbonyl-ethyl)-N-chloroacetyl-2,6-dimetylaniline 990.3 g (= 4.76 g-moles) of α-(2,6-dimethylanilino)-propionic acid methyl ester is mixed with 605 g (= 5.7 g-moles) of sodium carbonate in 2.5 litres of benzene (absolute). An amount of 455 ml (= 5.7 g-moles) of monochloroacetyl chloride is then added dropwise and sufficiently slowly to ensure that a temperature of 30°–35° in the reaction mixture is not exceeded. After stirring has been maintained overnight at room temperature, the mixture is filtered off, and the filtrate concentrated in a rotary evaporator at ca. 50°. The resulting residue is recrystallised from ligroin (boiling range 65°–90°). The yield obtained is 1132 g (= 83.8% of theory) of final product, M.P. 92°–94° (compound No. 3).

The reaction can also be performed in chlorobenzene at 100° with the addition of 0.1 g-mole of dimethyl-formamide as catalyst Manufacture of the desired enantiomeric D-forms from the racemic mixture of starting material A. Formation of optically active salts One g-mole (+) α-phenylethylamine is added dropwise to a solution of D,L-N-α[(2,6-dimethylanilino)]-propionic acid in diisopropyl ether. After a short time precipitation of the following product begins.

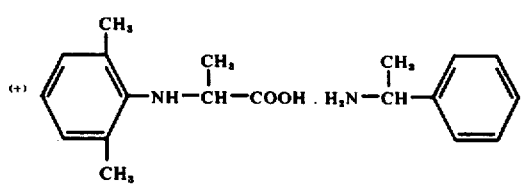

The mixture is left to stand overnight, filtered under suction and the filtrate evaporated. Precipitate and concentrated filtrate are submitted separately to fractional cristallisation until a constant melting point is obtained. Solvents used are ethyl acetate, acetonitrile and water.

B. In order to liberate the D(+)-form of the acid the corresponding salt is treated with 2 n sodium salt in ether. The alkaline aqueous phase is acidified under cooling to a pH 3 to 4 with 6 n hydrochloric acid and extracted with methylenechloride.

After drying of the extract over sodium sulfate the solvent is evaporated on a rotation evaporator and the crystalline D-acid which remains is recrystallised three times from petrol:

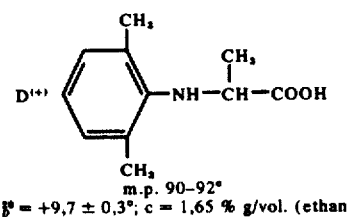

m.p. 90–92°
$[\alpha]_D^{20} = +9,7 \pm 0,3°; c = 1,65$ % g/vol. (ethanol)

C. The subsequent esterification of the free acid is carried out in the usual manner employing methanol or ethanol respectively in the presence of hydrogen chloride and produces the optically active ester intermediates:

Methyl ester [D(+)]: B.p. 74°–76°/0.01 Torr; $[\alpha]_D^{20} = +29,8 + 0,5°; c = 1,52$ %, g/vol. (methonal).

Ethyl ester [D(+)]: B.p. 81°–83°/ 0.01 Torr; $[\alpha]_D^{20} = +26,7 \pm 0,5°; c = 1,23$ % g/vol. (ethanol).

Subsequent haloacetylation of these esters results in D-forms of the compounds of formula I having a negative angle of rotation.

The following compounds of formula 1 are prepared in this manner or by one of the above described methods:

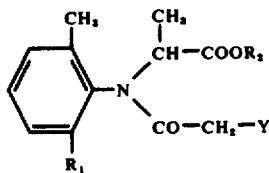

(I)

Table I

| Comp. No. | $R_1$ | Y | $R_2$ | Physical characteristics |
|---|---|---|---|---|
| 1 | $CH_3$ | F | $CH_3$ | M.P. 90 – 91° C |
| 2 | $CH_3$ | F | $C_2H_5$ | |
| 3 | $CH_3$ | Cl | $CH_3$ | M.P. 92 – 94° C |
| 4 | $CH_3$ | Cl | $C_2H_5$ | M.P. 68 – 69° C |
| 5 | $CH_3$ | Br | $CH_3$ | M.P. 79 – 80° C |
| 6 | $CH_3$ | Br | $C_2H_5$ | M.P. 75 – 77° C |
| 7 | $CH_3$ | J | $CH_3$ | M.P. 78 – 79° C |
| 8 | $CH_3$ | J | $C_2H_5$ | |
| 9 | $C_2H_5$ | F | $CH_3$ | M.P. 85 – 88° C |
| 10 | $C_2H_5$ | Cl | $CH_3$ | B.P. 160 – 162° C/0.01 Torr |
| 11 | $C_2H_5$ | Br | $CH_3$ | B.P. 150 – 152° C/0.08 Torr |

Table II

Enantiomeric D(−) forms of the racemic compounds of Table I

| Comp. No. | $R_1$ | Y | $R_2$ | Physical characteristics |
|---|---|---|---|---|
| 1a | $CH_3$ | F | $CH_3$ | $(\alpha)_D^{20} = -58.6 \pm 0.6°$ c = 1.65% g/vol. (methanol) M.P. 75 – 77° C |
| 3a | $CH_3$ | Cl | $CH_3$ | $(\alpha)_D^{20} = -50.3 \pm 1°$ c = 1.47% g/vol. (acetone) M.P. 87 – 90° C |
| 5a | $CH_3$ | Br | $CH_3$ | $(\alpha)_D^{20} = -31.6 \pm 0.4°$ c = 1.64% g/vol. (methanol) |
| 7a | $CH_3$ | J | $CH_3$ | M.P. 70 – 71° C. $(\alpha)_D^{20} = -5.5 \pm 0.2°$ c = 1.59% g/vol. (methanol) M.P. 68 70° C. |
| 4a | $CH_3$ | Cl | $C_2H_5$ | $(\alpha)_D^{20} = -48.8°$ (ethanol). M.P. 54 – 55° C |

The compounds of formula I can be used on their own our together with suitable carries and/or additives. Suitable carriers and additives can be solid or liquid, and they correspond to the substances common in formulation practice, such as, e.g., natural and regenerated substances, solvents, dispersing agents, wetting agents, adhesives, thickeners, binders and/or fertilizers.

Such microbicidal agents according to the invention are produced in a manner known per se by the intimate mixing and/or grinding of active substances of formula I with suitable carriers, optionally with the addition of dispersing agents or solvents that are inert to the active substances. The active substances can be obtained and used in the following forms:

solid preparations: dusts, scattering agents, granulates, coated granulates, impregnated granulates and homogeneous granulates;

liquid preparations:
 a. water-dispersible active-substance concentrates: wettable powders, pastes or emulsions;
 b. solutions.

The content of active substance in such agents is 0.1 to 90 %. For practical application, it is possible to use dilution concentrations of down to ca. 0.001 % of active substance.

In order to widen or modify the spectrum of activity of the active substances of formula I, they can be mixed with known fungicides, bactericides, fungistatics of bacteriostatics, and also with insecticides, acaricides or herbicides; and, by virtue of their systemic action rendering possible an application to the soil, also with nematicides, whereby in some cases synergistically enhanced effects are obtained.

Granulate

The following substances are used to prepare a 5% granulate:

5 parts of N-(1'-methoxycarbonyl-ethyl)-N-chloroacetyl-2,6-dimethylaniline, 0.25 part of epichlorohydrin, 0.25 part of cetyl polyglycol ether, 3.50 parts of polyethylene glycol, 91 parts of kaolin (particle size 0.3 – 0.8 mm).

The active substance is mixed with epichlorohydrin and dissolved in 6 parts of acetone; the polyethylene glycol and cetyl polyglycol ether are then added. The solution thus obtained is sprayed on kaolin, and the acetone subsequently evaporated off in vacuo.

Wettable powder:

The following constituents are used to prepare a 50% wettable powder:

50 parts of N-(1'-methoxycarbonyl)-ethyl)-N-chloroacetyl-2,6-dimethylaniline, 5 parts of sodium dibutylnaphthylsulphonate, 3 parts of naphthalenesulphonic acid/phenol sulphonic acid/formaldehyde condensate 3:2:1, 20 parts of kaolin, 22 parts of Champagne chalk.

The given active substance is absorbed onto the appropriate carrier (kaolin), and the whole subsequently mixed and ground. The resulting wettable powders have excellent wettability and suspension properties. From such wettable powders it is possible to obtain, by dilution with water, suspensions of any desired concentration.

Emulsion concentrate:

The following constituents are mixed together to obtain a 25% emulsion concentrate:
- 25 parts of N-(1'-methoxycarbonyl-ethyl)-N-bromoacetyl-2,6-dimethylaniline,
- 5 parts of a mixture of nonylphenolpolyoxyethylene and calcium dodecylbenzenesulphonate,
- 35 parts of 3,5,5-trimethyl-2-cyclohexen-1-one,
- 35 parts of dimethylformamide.

This concentrate can be diluted with water to obtain emulsions of suitable concentration.

The following tests describe the fungicidal properties of the active substances of formula I:

EXAMPLE 2

Action against Phytophthora infestans on Solanum lycopersicum (= tomatoes)

Ia. Residual-preventive action

Solanum lycopersicum plants of the variety "Roter Gnom" (red gnome) are sprayed after three weeks' growth with a liquor containing 0.05% of active substance (prepared from the active substance in the form of a wettable powder); the applied coating is allowed to dry, and the plants are then infested with a zoospore suspension of Phytophthora infestans. The plants afterwards remain for 6 days in a controlled-atmosphere chamber at 18° to 20°, with high atmospheric humidity produced by means of an artificial spray. Typical leaf spots appear after this length of time: their size and number serve as a criterion for the evaluation of the examined substance.

| Active substance No. | Infestation % |
|---|---|
| 1 | <5% |
| 3 | <5% |
| 5 | 5-20% |
| 4a | 5-20% |
| 10 | <5% |

At a concentration of only 0.02%, active substance No. 3 reduced infestation to <5%.

Ib. Curative action

Tomato plants of the variety "Roter Gnom" are sprayed, after three weeks' cultivation, with a zoospore suspension of the fungus, and incubated in a chamber at 18° to 20° with saturated atmospheric humidity. The incubation treatment is interrupted after 24 hours; the plants are dried and then sprayed with a liquor containing the active substance in the form of a wettable powder in a concentration of 0.05%. The applied coating is allowed to dry, and the plants are then returned to the moist-atmosphere chamber for 4 days. The number and size of the typical leaf spots appearing after this time serve as a criterion for an assessment of the effectiveness of the tested substances.

| Active substance No. | Infestation % |
|---|---|
| 1 | <5% |
| 3 | <5% |
| 4 | 5-20% |
| 5 | 5-20% |

At a concentration of only 0.02%, active substance No. 3 reduced the level of infestation to <5%.

II. Preventive-systemic action

The active substance in the form of a wettable powder is applied in a concentration of 0.05% (relative to the volume of soil) to the surface of the soil of three-week old potted tomator plants of the variety Roter Gnom. After a period of three days, the under side of the leaves of the plants is sprayed with a zoospore suspension of Phytophthora infestans. The plants are then stored for 5 days in a spray chamber at 18° - 20° with a saturated atmosphere. The typical leaf spots appear after this time; on the basis of their number and size, an evaluation is then made of the effectiveness of the tested substances.

| Active substance No. | Infestation % |
|---|---|
| 3 | <5% |
| 5 | 20% |
| 10 | 5-20% |

The active substance No. 3, at a concentration of only 0.02%, reduced infestation to 0-5%.

EXAMPLE 3

Action against Plasmopara viticola (Bert. et Curt.) (Berl. et DeToni) on grape vines a. Residual-preventive action Grape-vine cuttings of the variety "Chasselas" were grown in a greenhouse. Three plants were sprayed in the 3-leaf stage with a liquor prepared from the active substance formulated as a wettable powder. After drying of the applied coating, the plants were uniformly infested on the underside of the leaves with the spore suspension of the fungus. The plants were subsequently kept for 8 days in a moist chamber. Clear infection symtoms had appeared on the control plants after this period of time. The number and size of the areas of infection on the treated plants served as a criterion in the evaluation of the effectiveness of the tested substances.

| Active substance No. | Concentration | Infestation % |
|---|---|---|
| 3 | 0,05% | <5% |
| 3 | 0,02% | <5% |
| 5 | 0,05% | <5% |
| 6 | 0,05% | <5% |
| 4a | 0,05% | <5% | b. Curative action

Grape-vine cuttings of the variety Chasselas were grown in a greenhouse, and in the 10-leaf stage infested on the underside of the leaves with a spore suspension of Plasmopara viticola. After a standing time of 24 hours in a moist chamber, the plants were sprayed with active-substance liquor that had been prepared with a wettable powder of the active substance. The plants were subsequently kept for a further 7 days in the moist chamber. Infection symtoms had apppeared on the control plants after this length of time. The number and size of the areas of infection were taken as a criterion in the assessment of the effectiveness of the tested substances.

| Active substance No | Concentration | Infestation % |
|---|---|---|
| 1 | 0,05% | <5% |
| 3 | 0,05% | <5% |
| 3 | 0,02% | <5% |
| 5 | 0,05% | <5% |
| 5 | 0,02% | <5% |
| 6 | 0,05% | <5% |
| 6 | 0,02% | <5% |
| 4a | 0,05% | <5% |

EXAMPLE 4

Action against Puccinia triticina on rye.
Residual-preventive action.

Rye plants 5 – 7 cm in height were sprayed, in a greenhouse, with a 0.05% active-substance liquor prepared from a wettable powder, so that the plants were covered with an even coating of droplets. After drying of this applied coating, the plants were uniformly infested with a uredospore suspension of the fungus. After 2 days' standing in a moist chamber (at 18°–20° C and with saturated atmospheric humidity) and a further 10 – 12 days in a greenhouse at 20°–22° C with normal atmospheric humidity, when the untreated plants had suffered complete infestation, an evaluation of the test results was made. The number and extent of the area of infection on the treated plants was taken as a basis for the assessment of the effectiveness of the tested substances.

| Active substance No. | Infestation % |
|---|---|
| 5 | 5–20% |
| 6 | 5–20% |
| 4a | 5–20% |

What I claim is:

1. A fungicidal composition comprising a fungicidally effective amount of the enantiomeric D-form of a compound of formula I

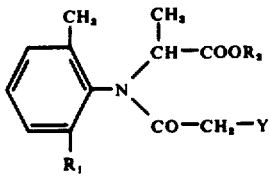

wherein $R_1$ and $R_2$ each independently are methyl or ethyl, and Y is fluorine, chlorine, bromine or iodine, together with a suitable inert carrier 2. The fungicidal composition according to claim 1 wherein one of $R_1$ and $R_2$ is methyl and the other is methyl or ethyl.

3. The fungicidal composition according to claim 1 wherein $R_1$ and $R_2$ are methyl.

4. The fungicidal composition according to claim 1 wherein said compound corresponds to the formula

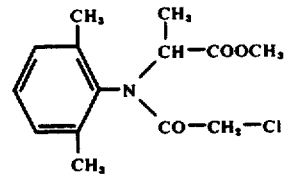

5. A process for the control of fungi which comprises applying to the locus to be protected a fungicidally effective amount of the racemic mixture or the enantiomeric D-form of a compound of the formula

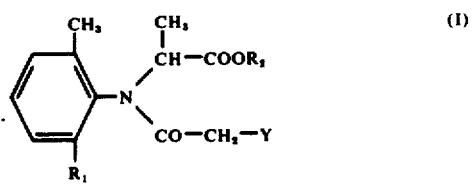

wherein $R_1$ and $R_2$ each independently are methyl or ethyl and Y is fluorine, chlorine, bromine or iodine.

6. The process of claim 5, wherein in said compound one of R1 and $R_2$ is methyl and the other is methyl or ethyl.

7. The process of claim 5, wherein $R_1$ and $R_2$ are methyl.

8. The process of claim 5, wherein said compound corresponds to the formula

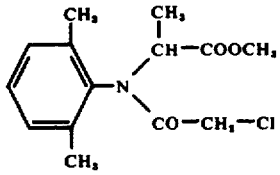

9. The process of claim 5, wherein said compound is in its enantiomeric D-form.

* * * * *